(12) United States Patent
Labsky et al.

(10) Patent No.: US 9,384,736 B2
(45) Date of Patent: Jul. 5, 2016

(54) METHOD TO PROVIDE INCREMENTAL UI RESPONSE BASED ON MULTIPLE ASYNCHRONOUS EVIDENCE ABOUT USER INPUT

(75) Inventors: Martin Labsky, Prague (CZ); Tomas Macek, Prague (CZ); Ladislav Kunc, Hlusice (CZ); Jan Kleindienst, Nove Straseci (CZ)

(73) Assignee: Nuance Communications, Inc., Burlington, MA (US)

( * ) Notice: Subject to any disclaimer, the term of this patent is extended or adjusted under 35 U.S.C. 154(b) by 760 days.

(21) Appl. No.: 13/590,699

(22) Filed: Aug. 21, 2012

(65) Prior Publication Data

US 2014/0058732 A1    Feb. 27, 2014

(51) Int. Cl.
| | | |
|---|---|---|
| G10L 15/00 | (2013.01) | |
| G10L 15/04 | (2013.01) | |
| G10L 21/00 | (2013.01) | |
| G10L 25/00 | (2013.01) | |
| G10L 15/30 | (2013.01) | |
| G10L 15/22 | (2006.01) | |

(52) U.S. Cl.
CPC ........ *G10L 15/30* (2013.01); *G10L 15/22* (2013.01)

(58) Field of Classification Search
CPC ......... G10L 15/30; G10L 21/00; G10L 17/22; G10L 15/22; G10L 15/265; G10L 15/00; G10L 13/043; G10L 13/027; G10L 17/10; G10L 2015/221; G10L 2015/223; H04M 3/4938; H04M 2250/74; H04M 1/72561
USPC .............. 704/231, 201, 258, 270, 270.1, 275
See application file for complete search history.

(56) References Cited

U.S. PATENT DOCUMENTS

| | | | | |
|---|---|---|---|---|
| 5,983,190 | A * | 11/1999 | Trower et al. ................. | 704/276 |
| 6,453,290 | B1 * | 9/2002 | Jochumson .................... | 704/231 |
| 7,137,126 | B1 * | 11/2006 | Coffman et al. .............. | 719/328 |
| 7,139,715 | B2 * | 11/2006 | Dragosh et al. ............ | 704/270.1 |
| 7,330,815 | B1 * | 2/2008 | Jochumson .................... | 704/231 |
| 7,415,100 | B2 * | 8/2008 | Cooper et al. ............. | 379/88.01 |
| 7,716,051 | B2 * | 5/2010 | Dow ....................... | G10L 15/30 |
| | | | | 704/235 |
| 8,301,454 | B2 * | 10/2012 | Paden ........................ | 704/270.1 |
| 2002/0091513 | A1 * | 7/2002 | Mozer et al. .................. | 704/220 |
| 2004/0107107 | A1 * | 6/2004 | Lenir et al. ................. | 704/270.1 |
| 2004/0128135 | A1 * | 7/2004 | Anastasakos ........... | G10L 15/30 |
| | | | | 704/270.1 |
| 2004/0243414 | A1 * | 12/2004 | Yamada et al. ............ | 704/270.1 |
| 2008/0154612 | A1 * | 6/2008 | Evermann et al. ............ | 704/275 |
| 2009/0204410 | A1 * | 8/2009 | Mozer et al. .................. | 704/275 |
| 2011/0184740 | A1 * | 7/2011 | Gruenstein ............. | G10L 15/32 |
| | | | | 704/275 |
| 2012/0084089 | A1 * | 4/2012 | Lloyd et al. ................... | 704/500 |
| 2012/0179471 | A1 * | 7/2012 | Newman ................. | G10L 15/30 |
| | | | | 704/270.1 |
| 2013/0132089 | A1 * | 5/2013 | Fanty ...................... | G10L 21/00 |
| | | | | 704/270 |
| 2013/0197915 | A1 * | 8/2013 | Burke et al. .................. | 704/275 |

* cited by examiner

*Primary Examiner* — Michael Ortiz Sanchez
(74) *Attorney, Agent, or Firm* — Banner & Witcoff, Ltd.

(57) ABSTRACT

Techniques disclosed herein include systems and methods for managing user interface responses to user input including spoken queries and commands. This includes providing incremental user interface (UI) response based on multiple recognition results about user input that are received with different delays. Such techniques include providing an initial response to a user at an early time, before remote recognition results are available. Systems herein can respond incrementally by initiating an initial UI response based on first recognition results, and then modify the initial UI response after receiving secondary recognition results. Since an initial response begins immediately, instead of waiting for results from all recognizers, it reduces the perceived delay by the user before complete results get rendered to the user.

19 Claims, 7 Drawing Sheets

FROM STEP 323 IN FIGURE 4

---

330
INITIATE A RESPONSE VIA A USER INTERFACE OF THE CLIENT ELECTRONIC DEVICE PRIOR TO RECEIVING A REMOTE SPEECH RECOGNITION RESULT FROM THE REMOTE AUTOMATED SPEECH RECOGNIZER, THE RESPONSE CORRESPONDS TO THE SPOKEN UTTERANCE, AT LEAST AN INITIAL PORTION OF THE RESPONSE IS BASED ON A LOCAL SPEECH RECOGNITION RESULT FROM THE LOCAL AUTOMATED SPEECH RECOGNIZER

331
CLASSIFY THE LOCAL SPEECH RECOGNITION RESULT INTO ONE OF MULTIPLE RELIABILITY CLASSES BASED ON A CONFIDENCE VALUE REPRESENTING ACCURACY OF THE LOCAL SPEECH RECOGNITION RESULT, AND WHEREIN THE INITIATED RESPONSE IS SELECTED BASED ON A PARTICULAR RELIABILITY CLASS ASSIGNED TO THE LOCAL SPEECH RECOGNITION RESULTS

332
USE A TEXT-TO-SPEECH SYSTEM THAT BEGINS PRODUCING AUDIBLE SPEECH

333
USE ONE OR MORE FILLER WORDS THAT CONVEY POSSESSION OF THE SPEECH RECOGNITION RESULTS

335
USE A GRAPHICAL USER INTERFACE THAT BEGINS DISPLAYING GRAPHICS CORRESPONDING TO THE SPOKEN UTTERANCE

336
USE A SEQUENCE OF GRAPHICS THAT APPEARS AS A COMMENCEMENT OF SEARCH RESULTS

---

TO STEP 350 IN FIGURE 6

METHOD TO PROVIDE INCREMENTAL UI RESPONSE BASED ON MULTIPLE ASYNCHRONOUS EVIDENCE ABOUT USER INPUT

BACKGROUND

The present disclosure relates to speech recognition, and particularly to speech recognition providing voice-activated/voice command functionality, and voice query functionality. Speech recognition, or automatic speech recognition, involves a computerized process that identifies spoken words. There are many uses for speech recognition, including speech transcription, speech translation, ability to control devices and software applications by voice, call routing systems, voice search of the Internet, etc. Speech recognition systems can optionally be paired with spoken language understanding systems to extract meaning and/or commands to execute when interacting with systems.

Speech recognition systems are highly complex and operate by matching an acoustic signature of an utterance with acoustic signatures of words. This matching can optionally be in combination with a language model. Thus, both acoustic modeling and language modeling can be used in the speech recognition process. Acoustic models can be created from audio recordings of spoken utterances as well as associated transcriptions. The acoustic model then defines statistical representations of individual sounds for corresponding words. A speech recognition system uses the acoustic model to identify a sequence of sounds, while the speech recognition system uses the language model to identify possible word sequences from the identified sounds.

Speech recognition providing voice-activated or voice command functionality enables speakers to control devices and systems by speaking various instructions or queries. For example, a speaker can utter a command to execute a specific task, or utter a query to retrieve specific results. Spoken input can follow a rigid set of phrases that perform specific tasks, or spoken input can be natural language, which is interpreted by a natural language unit of a speech recognition system. Voice command functionality is becoming increasingly popular on portable devices, especially battery-powered portable devices such as cell phones, laptops, and tablet computers.

SUMMARY

User interfaces of electronic devices can make use of various recognition technologies, such as automated speech recognition (ASR) and handwriting, to respond to user input. Some systems can combine multiple recognition engines to process a single input from the user, such as a voice query or voice command. Combining multiple recognizers can be especially beneficial in embedded environments, such as with automotive assistance systems, tablet computers, and cell phones. A local recognizer at a client device can be advantageously combined with more powerful remote recognizers at a server.

A local recognizer can typically provide a very fast response to user speech input, but this fast response is not always accurate. A local recognizer typically provides less coverage of a given input domain, and can be less accurate due to limited system resources. A remote recognizer, however, can provide superior coverage and accuracy, but results from the remote recognizer are not immediate, due to network delays, or may not be available at all due to connectivity problems. One approach to using multiple recognizers is to run the local recognizer first, and then—based on confidence from the local result—the local result is either accepted and a corresponding local result is presented to a user, or the local result is rejected and the system waits for results from a more powerful remote recognizer before rendering a response. The local and remote recognizers can operate in parallel to accelerate receiving remote recognition results.

The local recognizer can be configured so as to cover only part of a user's input, leaving the remaining part of user input for recognition by more powerful (typically remote) recognizers. This technique is known as "gating" the user input. For example, "Navigate to" could be modeled by a local recognition grammar, while the remainder of the speech input, "Broadway, New York," could be subject to recognition using a dedicated recognizer optimized for address entry.

While techniques above provide a functional way of combining two or more recognizers, such techniques have several challenges or disadvantages. One disadvantage is that a "correct" recognition result is selected at a single point in time, which typically is when the local recognition result becomes available. Based on an assigned confidence value, an ultimate decision is typically made on how to respond. The system can provide immediate user interface (UI) response based on a local recognition result that covers an entire input of a user, such as, for an example, input of "show me the map." In scenarios when the local recognizer covers just part of the user input (gating, e.g. "navigate to <something>"), the system can instruct the remote recognizer to process a remaining part of user input, wait for the result, and only then provide UI response (a response produced via a UI). In a scenario when a local recognizer completely rejects the user input, e.g. "would you search for Thinkpad T61p," the system can instruct the remote recognizer to process the whole input, wait for results, and then carry out a UI response.

Such approaches have drawbacks. The UI response can be delayed until a time when the remote recognition result becomes available. Such a wait can lead to large perceived delays in the system's first meaningful reaction/response to the user input. Also, it is sometimes the case that the local recognizer is wrong even though the system accepts the local recognizer result with a high confidence value. These "false accepts" are often caused by two major factors. First, parts of the input modeled by the local recognizer can be very similar to the input intended to be processed by the more powerful or specialized recognizers. Second, the local recognizer is optimized to use limited system resources, often on embedded hardware, to provide recognition results in real time, which may affect the accuracy both of results and corresponding confidence scoring.

Techniques disclosed herein include systems and methods for managing user interface responses to user input. This includes providing incremental UI response based on multiple asynchronous evidence about user input. Such techniques provide meaningful UI responses to a user at an early time, before a remote recognition result is available. Such techniques also improve an arbitration accuracy between recognition results by taking into account information from results arriving at a later time. Systems herein can respond to a user incrementally based on uncertain early recognition results. Systems herein can optionally provide techniques for canceling an already rendered UI response that was found to be probably wrong based on recognition results arriving at a later time.

One embodiment includes a speech recognition response manager that executes a user interface response process or system. The speech recognition response manager or client device receives a spoken utterance at a client electronic device. The client electronic device includes a local automated speech recognizer. The speech recognition response manager analyzes the spoken utterance using the local automated speech recognizer. The client device transmits at least a portion of the spoken utterance over a communication network to a remote automated speech recognizer that analyzes spoken utterances and returns remote speech recognition results, such as by a network-accessible server. Prior to receiving a remote speech recognition result from the remote automated speech recognizer, the speech recognition response manager initiates a response via a user interface of the client electronic device. The response corresponds to the spoken utterance. At least an initial portion of the response is based on a local speech recognition result from the local automated speech recognizer. The speech recognition response manager can then modify the response after the response has been initiated and prior to completing delivery of the response via the user interface such that modifications to the response are delivered via the user interface as a portion of the response. Such modifications are based on the remote speech recognition result. For example, in embodiments in which the user interface includes a text-to-speech system, the client device can begin speaking words as if the client device were already in possession of results, and then add words to the response after receiving results from a remote server. An initial response then begins immediately instead of waiting for results from all recognizers. This reduces a perceived delay by the user because even with the initial response comprising filler or introductory words, the commencement of a response signals to the user that results have been retrieved and the client device is in the process of conveying the results.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform (or causes the processor to perform) the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: receiving a spoken utterance at a client electronic device, the client electronic device having a local automated speech recognizer; analyzing the spoken utterance using the local automated speech recognizer; transmitting at least a portion of the spoken utterance over a communication network to a remote automated speech recognizer that analyzes spoken utterances and returns remote speech recognition results; prior to receiving a remote speech recognition result from the remote automated speech recognizer, initiating a response via a user interface of the client electronic device, the response corresponding to the spoken utterance, at least an initial portion of the response is based on a local speech recognition result from the local automated speech recognizer; and modifying the response after the response has been initiated and prior to completing delivery of the response via the user interface such that modifications to the response are delivered via the user interface as a portion of the response, the modifications being based on the remote speech recognition result. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations.

As discussed above, techniques herein are well suited for use in software applications supporting speech recognition response. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Techniques disclosed herein include systems and methods for managing user interface responses to user input. This includes providing incremental UI response based on multiple asynchronous evidence about user input. Such techniques provide meaningful UI responses to a user at an early time, before a remote recognition result is available. Such techniques also improve an arbitration accuracy between recognition results by taking into account information from results arriving at a later time. Systems herein can respond to a user incrementally based on uncertain early recognition results. Systems herein can optionally provide techniques for canceling an already rendered UI response that was found to be probably wrong based on recognition results arriving at a later time. Since an initial response begins immediately instead of waiting for results from all recognizers. This reduces a perceived delay by the user because even with the initial response comprising filler or introductory words, the commencement of a response signals to the user that results have been retrieved and the client device is in the process of conveying the results.

Figure 1:
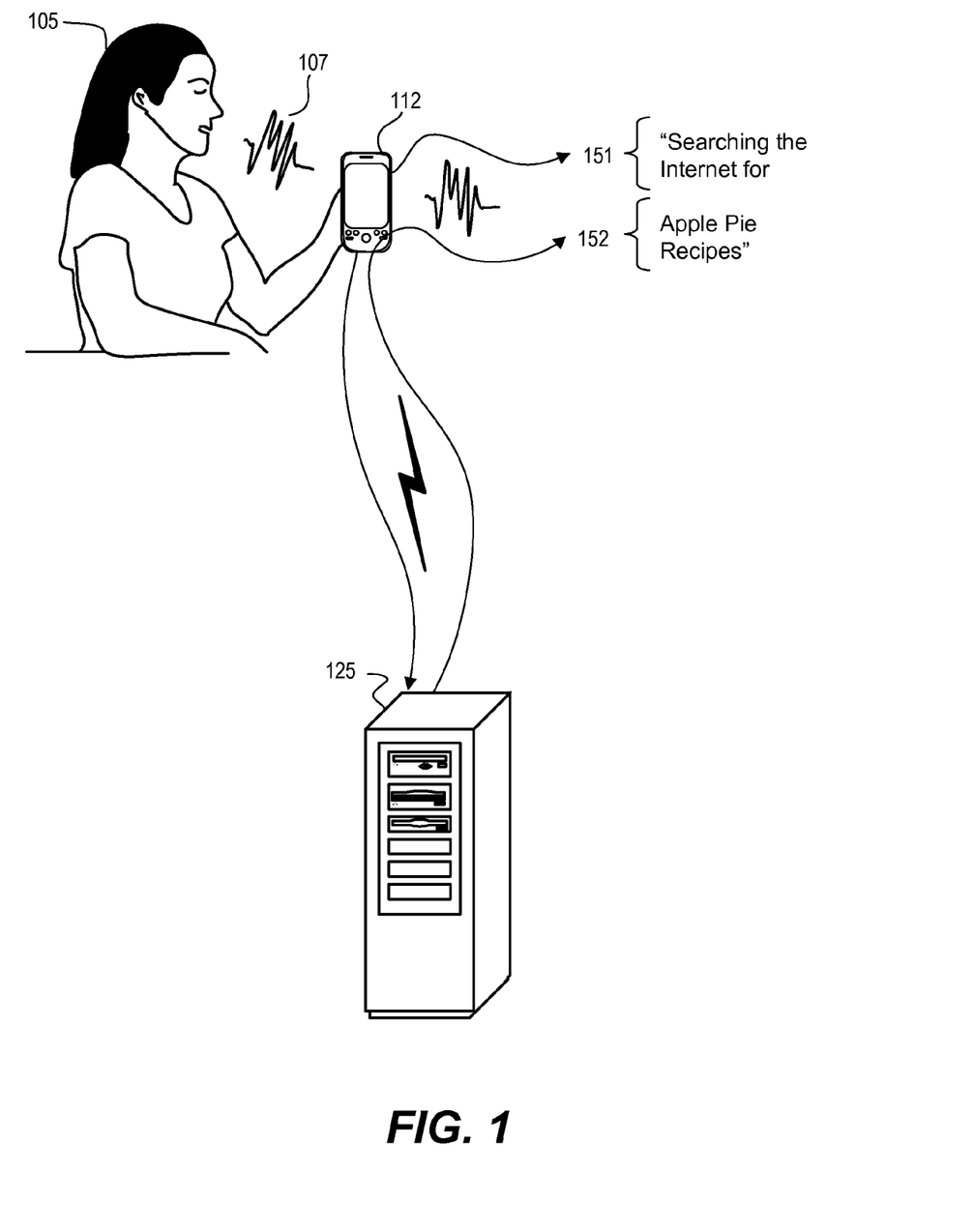
FIG. 1 is a diagram of a system supporting speech recognition response management functionality according to embodiments herein.

Referring now to FIG. 1, a diagram shows an example of user interface (UI) response management. A user 105 speaks input, which is a spoken utterance 107 in this example. The input can be a command or query directed to a client device 112 for execution. The client device 112 transmits a portion or all of spoken utterance 107 to a remote speech recognizer, which can be network-connected server 125. The client device 112 and server 125 can simultaneously analyze the spoken utterance 107. Depending on a particular network connection, results received from the remote recognizer can take approximately one to five seconds or longer to be received at the client device 112. Conventionally a client device simply waits for the response. Such a wait, however, can be perceived as a long delay. With techniques herein, however, the client device 112 can initiate a response to spoken utterance prior to having any specific results. For example, client device can analyze the spoken utterance 107 and identify that the user is searching for something. In response, the client device can initiate a response via a user interface, such as with a text-to-speech system. In this non-limiting example, the local recognizer initiates producing or speaking word 151, "Searching the Internet For." These introductory or filler words are then modified by adding words 152, "Apple Pie Recipe," which are presented after words 151. With such a technique, a response to user input is initiated via a user interface prior to having complete results, and then the UI response is modified (in this example the UI response is added-to) to convey results corresponding to the spoken query, such as search results.

There are several aspects and alternatives to embodiments herein. Two or more recognizers can be configured for use herein. During each interaction by a given user, user input can be streamed to all recognizers and processed by the recognizers in parallel. Alternatively, input can be streamed to certain recognizers after processing by an initial recognizer. For example, some recognizers can have a configuration that depends on the output of "gating" the user input, such as a dedicated address recognizer. Typically there is one recognizer executed at the client device, and one or more recognizers executed at one or more remote servers. In some embodiments, however, all recognizers can be located at the client device. For simplicity in describing embodiments herein, examples will primarily focus on systems having three recognizers available. A first recognizer is a fast local recognizer that models just a small part of possible user input. Some input can be analyzed by the local recognizer completely. Other input can be analyzed partially to form gate commands. A second recognizer is an open domain recognizer (such as open-domain dictation or web search ASR). The open domain recognizer is typically connected remotely, and so results from this recognizer typically arrive after a delay. The delay can be about one second to several seconds or more after submitting a last part of the user input, that is, after the recognizer receives a complete transmission. A third recognizer is a slot recognizer or content-specific recognizer. The slot recognizer is used to process remainders or "slots" of gate commands, if any gate commands are identified by the local recognizer. There can be multiple types of recognizers or recognition models, with each recognizer optimized for the content specific to each kind of gate command. The slot recognizer can process part of the input that corresponds to an expected slot, or the slot recognizer can re-process the full user input.

In cases when speed of a UI response is a primary concern and there are not many specialized slot recognizers available, the full user input can be streamed in real time to several different slot recognizers, with only one recognizer being used when the local recognizer indicates a corresponding gate command. Note that for gate commands, the recognition time of slot contents can be unnecessarily long when the slot recognizer is started only after the initial recognition result is available. In this scenario, a result of the general purpose/open-domain recognizer is typically available earlier. If the result contains a segment or portion that can be aligned with the gate command wording (the segment is similar enough using a particular similarity measure), then the slot value can be extracted from the result, yielding an approximate version of the slot content available before a content-specific recognizer delivers its result.

Multiple recognizers can also be used based on reliability classifications of initial recognition results. The local recognition result, which is typically available before results from content-specific or open-domain recognizers, is often burdened with high uncertainty. In other words, the quickly received local recognition results are often not accurate. Techniques herein can use a classifier that classifies this initial recognition result. This classification can cover the whole input (spoken utterance) or just the gated portion. The system can classify initial recognition into multiple different reliability classes. For convenience in describing embodiments, examples herein will use three reliability classes that govern subsequent use of speech input. Note, however, that just two classes can be used, or, optionally, more than three classes can be used. The three classes used for example herein are: (1) Rejected, (2) Maybe Accepted, and (3) Accepted. With the Rejected classification, the input is unlikely to have been correctly recognized by the recognizer (e.g. based on a confidence value). With Maybe Accepted, the local recognizer might have correctly recognized the user input, but more evidence is needed to confirm this tentative classification. With the Accepted classification, the local recognition results are likely to be correct. Such a classifier can be implemented in several ways, such as by imposing two threshold values on the confidence value of the first best phrase of the recognition result. Alternatively, the classifier may be implemented by a set of rules that take into account different confidence thresholds for different meaning classes output by the recognition result. For example, there can be different thresholds for simple control commands such as "map screen" versus more complex queries such as "search for ankle sprain remedies." When transcribed/annotated in-domain user input data are available, such a classifier can be trained using widely available machine learning techniques. An example feature set can include confidence values of the n-best phrases of the recognition result, the meaning class of the n-best phrases (if output by an underlying grammar), the wordings of the n-best phrases, the application state, or the degree to which the meaning classes of the n-best phrases are expected at this state of UI/dialog.

As the impact of the UI providing an incorrect response to different meaning classes of user input varies with each meaning class, a classifier typically benefits from a weighted training procedure that makes use of the different perceived "costs" of "false accept" and "false reject" decisions for each type of meaning class. For example, a "false accept" of "navigate to a new address" would have a higher cost than "false accept" of a "help" request. Applying the reliability classifier to the recognition result may also be used to rescore and change the n-best order of its n-best items. This is useful e.g. when a second n-best item does not show a significant drop in confidence value, but its meaning, as assigned by the grammar, is more appropriate than that of the first-best phrase at the current UI/dialog state. Such n-best reordering can be achieved, for example, by applying the above described reliability classifier to each of the n-best phrases, outputting a classification result and a classification confidence score (e.g. "Accepted, with score 95", or "Rejected, with score "90"), and then re-sorting the n-best items according to the classification results and their scores.

Embodiments can react to the initial recognition results in various ways. When an initial recognition result is labeled as Rejected, then the local recognition is not useful and the UI needs to wait for subsequent recognition results. In response, an auditory and/or visual indication can be rendered on the UI to inform the user that results are under way. When an initial result is labeled as Maybe Accepted, the system can then perform backend queries silently and perform mutable initial UI response (a response that is in better form for modification during its rendering). When an initial result is labeled as Accepted, then the system can perform backend queries and perform full initial UI response if initial recognition result covered the full user input. Alternatively, the system can perform a mutable initial UI response if it only covered its "gate" part.

Performing backend queries can take time. If the meaning class of the local recognition result requires results from backend data, the system starts respective data queries immediately after receiving the local recognition result, which typically is close to real-time. The respective web services or databases are queried immediately without knowing for sure what will be needed for appropriate results. This can save time in case the uncertain initial recognition result is later confirmed. By way of a non-limiting example, a spoken utterance (user input) of "Find the cheapest groceries" has the grammar-assigned meaning "Retrieve POIs of type grocery near current position, sort ascending by price range." A web service is queried in real time despite the reliability of the recognition result may only be "Maybe Accepted," and the true recognition can be found to differ semantically.

Prior to receiving results from backend queries, embodiments can begin speaking or displaying a response via an available user interface. This initial UI response can be mutable and include audio splicing and repair. The initial UI response can be started early if it is easily modifiable or cancelable at a later time, leading to an impression (user impression) of a very fast UI response. Such UI response can be started despite the fact that the initial recognition result is uncertain, such as "maybe accepted", and/or the local result only covers the "gate" part of the user's full input. The UI response can be auditory. Auditory output is serial in nature, and thus can be used to play back the leading parts of the announcement very early, without knowing the full message to be announced in advance. This is in fact done very often naturally by people when asked to perform something and provide response verbally. For example, if a person is asked to look-up a bus schedule for a time of a particular trip, the user may respond: "Let's see—the bus number 177—leaves your origin—Boston Logan Airport, Terminal E—at 5:30 pm." Also, a real person may make pauses. Example pauses are indicated in the previous spoken response using dash or hyphen marks. Examples from other domains are similar: "Searching the web for—APPLE PIE RECIPES," and "Looking up nearest—SHELL GAS STATIONS WITH RESTROOMS." In these examples, the data values that can be presumably delivered by a slower recognizer at a later time are shown in uppercase type.

Note that there are multiple available leading parts (lower case) for most types of announcements. The following examples show alternative leading or introductory sections of a response:

A1: "Searching|for—APPLE PIE RECIPES"
A2: "Searching|the Internet|for|APPLE PIE RECIPES"
A3: "Searching|the Internet|for|the keywords|APPLE PIE RECIPES"
A4: "Searching|the Internet|for|the keywords|like—APPLE PIE RECIPES"
A5: "Searching|the Internet|for|the keywords|like|mmm just a moment—APPLE PIE RECIPES"

In this web search example, assume a user said "Search the Internet for Apple pie recipes," and that the local recognizer immediately recognized "Search the Internet for <something>" as a gate command, at time $T_{local}$. The recognition for "Apple pie recipes" can arrive later from another recognizer after some delay at time $T_{slot}$ (as for the search phrase slot). The system initially starts playing, at time $T_{local}$, the prefix of the prompt A1 until the first "|" delimiter ("Searching"). As the playback of the A1 prefix is about to finish, the system can either play back "for Apple pie recipes" following the playback of A1 prefix, if the slot recognition is already available, or play back the next part of the following prolonged prefix A2 "the Internet", or remain silent or play back auditory signal announcing "waiting" if the system runs out of prefixes before receiving results from a second recognizer.

Such a playback technique can be further enhanced by selecting from more variants of announcements that do not share common prefixes, such as those defined by the following rule(s): "Searching [[the] (web|Internet)] for [[the] (keywords|words)] [like] [mmm [just a (minute|moment)]]—Apple pie recipes." The selection of announcements from rules like the one above can be randomized to make the UI more natural. Additionally, the selection can take into account the predicted delay $PD_{slot}$ of the remote slot recognition ($T_{slot}-T_{local}$). The local system can model a probability distribution of this delay e.g. using: N recent slot recognition delays, length of the user input to process, current strength of the network connection, type of network connection, etc. One technique is to predict the slot recognition delay as a weighted average of N recent slot recognition delays, with the most recent ones receiving the highest weight.

Another technique can estimate, from observed data, the parameters of a function that outputs the expected delay and takes as its arguments up to N preceding recognition delays, length of user input (in seconds), and parameter(s) describing network conditions (such as recent ping delays). In addition to the expected delay value, this function can also predict the expected variance of the delay, which could be used to predict that, for example, the mean delay will be two seconds, and with 90% confidence the delay will be inside the interval (1; 3.8) seconds. One possible approach to modeling the probability distribution of the delay is to estimate a Gaussian mixture distribution from observed data.

Figure 2:
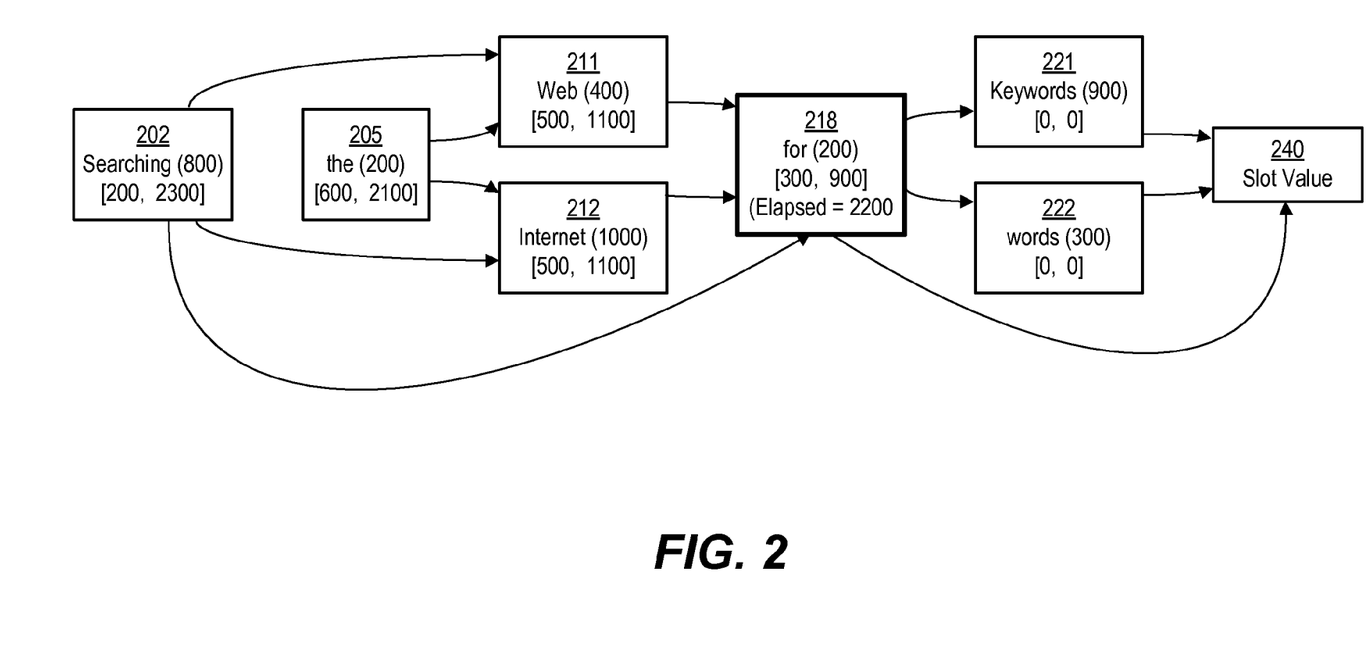
FIG. 2 is a block diagram showing speech recognition response decision making and state diagram based on predicted delay according to embodiments herein.

Referring to FIG. 2, given that we have a predicted $PD_{slot}$ recognition delay, the prompt selection algorithm can take multiple forms. Some of these algorithms can make use of the prompt rule(s) sketched in FIG. 2 as a state diagram of announcement prompts. Each state (202, 205, 211, 212, 218, 221, 222, and 240) contains a length of its audio in milliseconds in round brackets, and the minimum and maximum lengths of possible prefix segments following that state, in square brackets. For example, state 218 is shown here as the active state showing a length of audio played so far (2200 milliseconds), which approximately corresponds to time elapsed so far waiting for the slot recognition result.

A basic prompt-selection algorithm can function with various steps. For such an algorithm, parameters can include P(fluent), which represents a probability that there is a no silence or "waiting audio" period between the prompt prefix and the slot content. This can be set manually e.g. to 90% to require approximately 90% of prompts be fluent. The algorithm starts after the local recognizer has delivered its result, that result has been accepted (or maybe accepted) and the system needs to determine which prompt variant to play while waiting for further recognition result(s). The algorithm can first re-estimate the probability distribution of the current delay of the remote recognizer $PD_{slot}$. Then, from the $PD_{slot}$ cumulative distribution, retrieve a predicted delay value $PD_{slot}(safe)$ within which the remote recognition result(s) will come with P(fluent) probability, as: cumulative_distribution($PD_{slot}(safe)$)=P(fluent). Then the process retrieves, from the state representation on FIG. 2, all prompts that can be longer than $PD_{slot}(safe)$. The process selects a random prompt from this prompt set, and starts playing. If this prompt set is empty, then the system picks the longest prompt available. In response to the slot recognition arriving during the playback of the prompt, the system proceeds from the active state (currently playing segment) using the shortest path to play the slot value that has just become available. If the slot recognition did not arrive yet, and the end of the prefix playback approaches, the system enumerates a set of further states that can prolong the prefix being played. A random selection can be selected from these states and queued for playback. For example, if the prompt initially selected was "Searching the Internet for," but the slot recognition did not arrive yet when "for" was playing, then the possible states in FIG. 2 would be "words" and "keywords." This step can be looped until a slot recognition (from an open-domain recognizer or content-specific recognizer) arrives or until there are no further states available. If the slot recognition did not arrive before completion of the available states or introductory wording, then the UI can play a response to convey that system is waiting or that the results are taking longer than expected, etc.

Both the representation of prompts and the selection algorithm can be enhanced in several ways. The announcement prefix definitions may include prior probabilities affecting their likelihood of being picked. Also, when picking the next prompt segments to play when the remote recognition result did not come in the expected time $PD_{slot}(safe)$, the selection algorithm can be further optimized such as by preferring prompt segment states that have higher maximum durations, and/or that have large spans between these minimum and maximum durations so that the prolonged prompt is in better form to cut short once the result comes but still have a variant that could play longer in case of further delay. Also, when using a text-to-speech system, a speed of speech synthesis can be slowed or pauses can be inserted to lengthen the introductory response while awaiting slot recognition.

Embodiments can also repair initial UI responses. A slightly modified version of this process can present an early UI response in case the initial result provides a full interpretation of the user input, which is rated as "Accepted," but allows for repair at a later time. For example, a user input is "Find Wichita, Gross Street." The initial recognition is "find cheapest groceries" (rated as Accepted). The delayed remote recognition result, however, is "Find Wichita Gross Street." In this scenario, the initial recognition result was incorrect because this result did not cover address input, but the address spoken was very close to the point-of-interest (POI) types it did cover. Since the reliability of this result could have been assessed as "Accepted," the system can start a fast UI response by starting to play: "Looking up the nearest cheap groceries."

But at the time the remote recognition result arrives with a different address hypothesis, the system may decide to reject the original POI hypothesis. In such a scenario, the playing prompt can be dynamically changed and new content spliced into it without affecting the UI. For instance, if the playback is still within "Looking up," then the prompt definition (such as in FIG. 2) would allow for bailing out (correcting) from the original prompt playback after that segment, and proceed by playing back a new, correct prompt such as "Looking up . . . Wichita Gross Street." If the playback is still within "Looking up the nearest," then the same logic can connect to a new prompt definition such as "Looking up the nearest . . . address named Wichita Gross Street." If the playback is beyond the points above, then information already played can be cancelled using one or more cancellation techniques.

One technique of representing correction points from prompt definitions such as in FIG. 2 is to mutually connect prompt definitions having different semantics with arcs allowing the playback to be corrected from specific states of the currently playing prompt and proceed with the playback of another prompt, from a particular state.

Techniques can use audible user feedback and/or graphical user feedback. Techniques for presenting responses via a graphical user interface (GUI) can differ from those used with a text-to-speech engine because graphical feedback is not always linear or serial. Since displaying information visually is not serial, showing uncertain results on the GUI can complement techniques used herein for audio feedback. In one GUI feedback technique, an initial response for "Maybe accepted" initial results can be neutral and allow for some amount of possible changes. For example, a display of "Searching the map . . . " or an animation sequence that conveys to a person that the system is searching the map can be used as a candidate for a system covering POI and address functionality as in the above example. For "Accepted" initial results, the UI response can show specific information as it is much more likely that the initial result will be correct. Note that the reliability classifier should be tuned to minimize the amount of false accepts rated as "Accepted." Further, changes of GUI screens can also be incremental like voice response prompts. For example, a given user wants to navigate to Los Angeles. The system recognizes the input and starts route calculation to Los Angeles. The route calculation to distant places can take a relatively longer time than to a local destination. During the search and calculation period, the user is shown the neighborhood of the destination in the map. When the route calculation finishes, the whole route can be displayed on the map. In other words, various graphical techniques can be used to present the graphical response as more serial in nature.

In some embodiments, full UI response can be delayed until confirmation. Most applications can render incremental mutable UI response in case they receive an initial recognition result whose reliability was rated as "Maybe Accept." If, however, the final UI response for a given user input requires a backend search, then that search is started immediately in order for its search results to be ready for presentation when the user input is later confirmed. Confirming the initial recognition result can be done in a number of ways. One technique is to compare the initial result to a delayed result produced by another recognizer, which is considered more robust or more specialized. Such comparison may be executed at the string level using an exact match or different kinds of weighted edit distance measures. An example weighted edit distance measure can be defined at the level of words, allowing for free insertions/deletions/substitutions of unimportant words like "the," "a" or punctuation, and could be combined with a character-level edit distance used to compute edit costs for other words. Alternatively, the system can define a comparison function that compares the two results at interpretation/meaning level. Such a technique can compare sentence-level interpretation and slot values assigned by a local grammar with an interpretation and named entities assigned by a remote recognizer that can be employed. For example, a recognition based on a language model can be combined with subsequent text classification and named entity recognition. One mechanism for confirming or rejecting the initial recognition result is to compare the similarity between both recognition results to a predefined similarity threshold. In response to the initial recognition result being confirmed, a full UI response becomes free to get rendered by the UI (note that the system might still need to wait for all necessary backend queries to finish).

If the initial recognition result is rejected, the new recognition result can take over UI control. In case the initial UI response is in progress (or even full UI response in case the initial result was rated reliable as "Accepted") and this current UI response requires corrections, then the prompt splicing techniques described previously can be used to correct in-progress announcements.

Other strategies can be suitable for canceling incorrect UI responses that have already been rendered. Although the techniques described herein can minimize the number of initial UI responses that are discovered incorrect after a couple of seconds, in some configurations it may still happen that the GUI shows a wrong banner or that the audio starts playing back an announcement that is wrong. In such scenarios, there are several techniques that humans often use to excuse a "slip of the tongue." Selection of excuse techniques greatly depends on the application domain. For example, an embodiment using a virtual assistant primarily configured to add amusement may use more "human-like" patterns than an automated call center agent. In addition, the optimal "excuse" patterns selected can depend on whether the UI is voice-only (e.g. phone) or multi-modal (e.g. visual talking head gestures may be used to accompany a spoken excuse, cough, or throat clearing sound).

There are several excuse patterns and responses useful for auditory output. If an erroneous prompt is interrupted early enough to allow for a bailout strategy, or very shortly after the last bailout point, then that prompt can be interrupted and the correct one may continue playing. For example, if humans speak one initial incorrect word, then sometimes this incorrect word is simply followed by the correct word and from context a listener understands the correct response. In other techniques, an erroneous prompt can be interrupted by playing an excuse prompt like "Sorry," "Pardon me," playing a coughing or throat clearing sound, or playing an auditory notification indicating the system has changed its mind, and then optionally proceeding with a bridge like "Actually . . . ," or "Let me . . . ". By way of a non-limiting example, a given correction prompt can result in an entire spoken response sequence of "Searching for the nearest cheap . . . mmm . . . Sorry . . . Let me show you the address Gross Street, Wichita." Other excuse patterns are available for visual output. For example, replacing wrong information with the correct one (useful e.g. when the wrong information was only shown for a very short time). Also, a GUI can display a "sorry," "recalculating" or "processing" kind of banner for a short time, and then showing the correct information.

Figure 7:
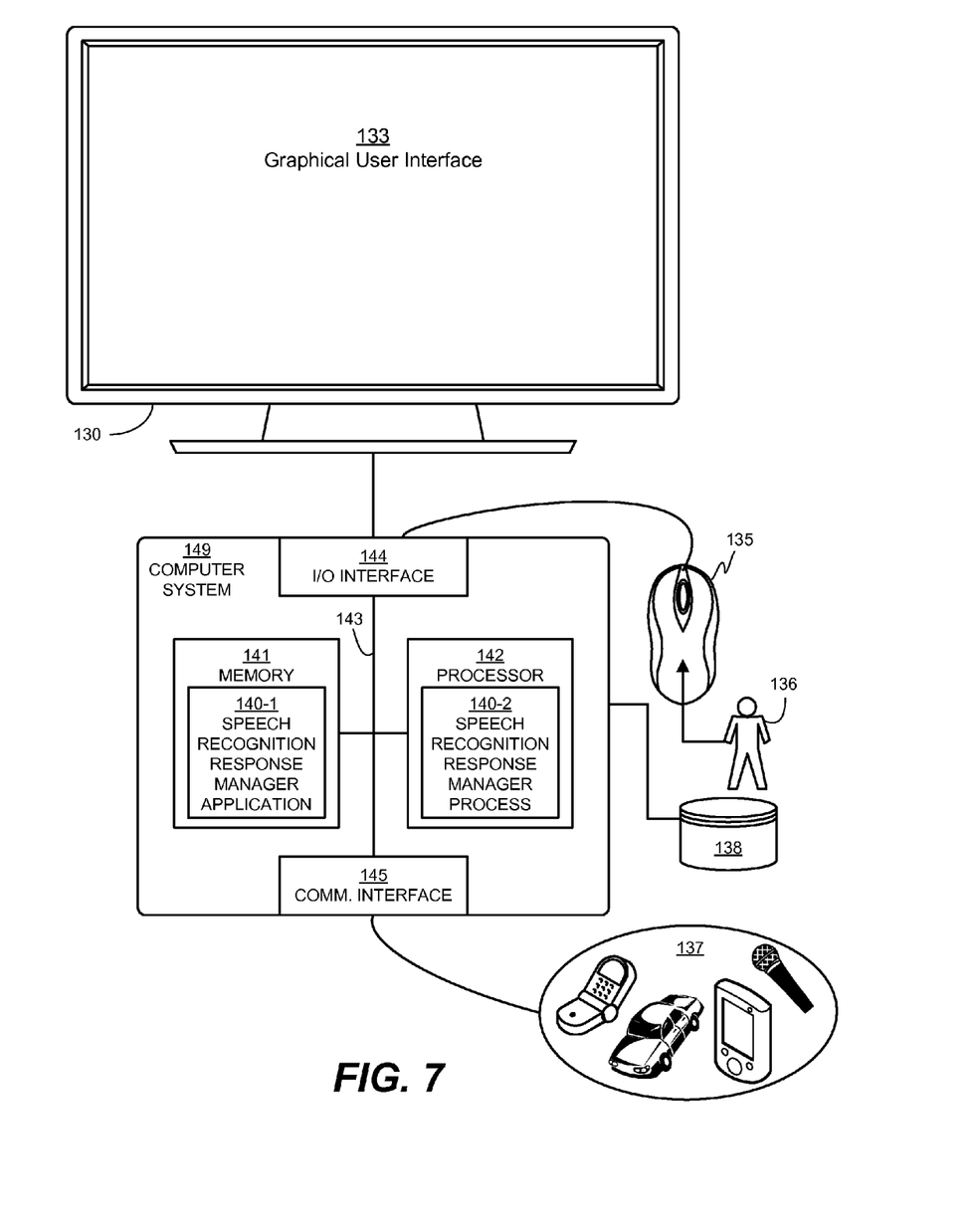
FIG. 7 is an example block diagram of a speech recognition response manager operating in a computer/network environment according to embodiments herein.

FIG. 7 illustrates an example block diagram of speech recognition response manager 140 operating in a computer/network environment according to embodiments herein. Computer system hardware aspects of FIG. 7 will be described in more detail following a description of the flow charts.

Functionality associated with speech recognition response manager 140 will now be discussed via flowcharts and diagrams in FIG. 3 through FIG. 6. For purposes of the following discussion, the speech recognition response manager 140 or other appropriate entity performs steps in the flowcharts.

Figure 3:
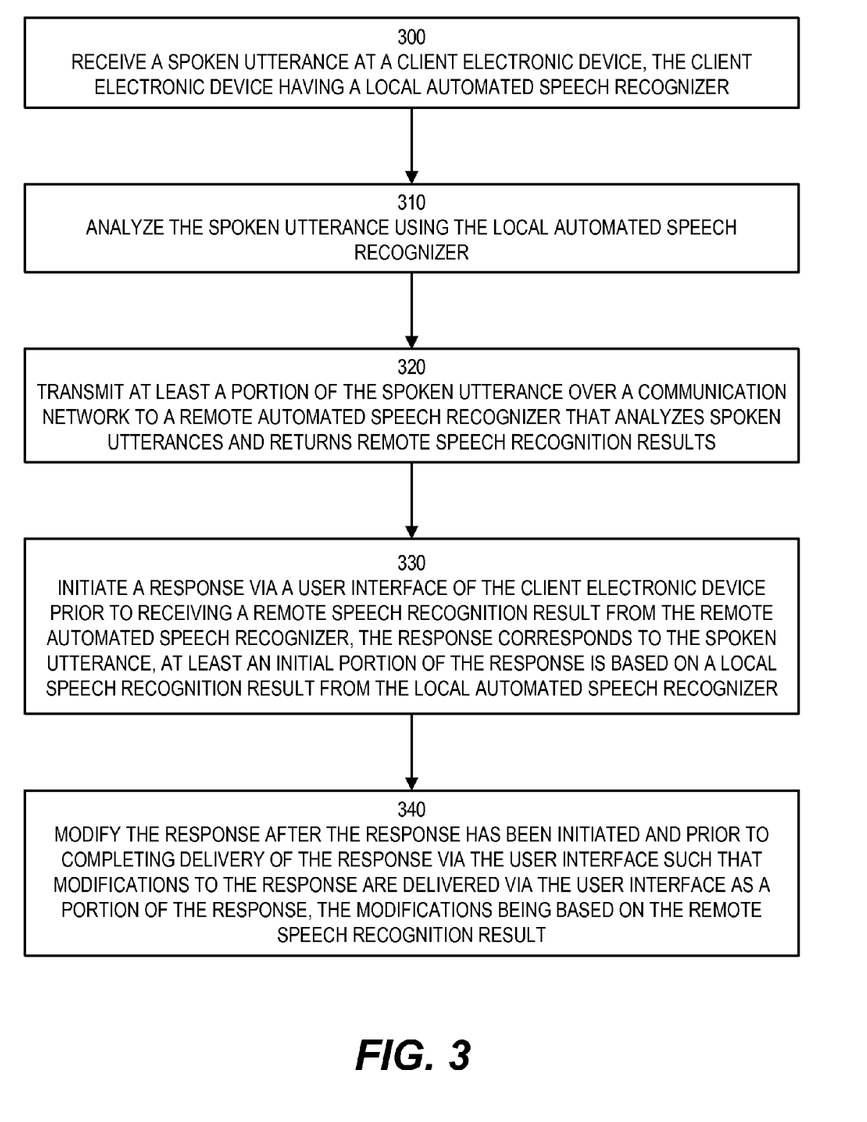
FIG. 3 is a flowchart illustrating an example of a process supporting speech recognition response management according to embodiments herein.

Now describing embodiments more specifically, FIG. 3 is a flow chart illustrating embodiments disclosed herein. In step 300, the speech recognition response manager receives a spoken utterance at a client electronic device, such as a person speaking to the client device via microphone. This client electronic device has a local automated speech recognizer. For example, the local recognizer is executed by a processor of the client device.

In step 310, the speech recognition response manager analyzes the spoken utterance using the local automated speech recognizer. In other words, the local recognizer attempts to produce a text sequence representing the spoken utterance.

In step 320, the speech recognition response manager transmits at least a portion of the spoken utterance over a communication network to a remote automated speech recognizer that analyzes spoken utterances and returns remote speech recognition results. This remote recognizer can be a personal computer synchronized with the client device, or a server computer accessible via a given communication network. The remote speech recognition results can be in various forms such as transcriptions, search results, command instructions, etc. Note that transmitting all or a portion of the spoken utterance can be executed before analysis by the local recognizer, after initial analysis by the local recognizer, and/or simultaneously with the local analysis. The term remote speech recognition results means results produced by a remote recognizer or secondary recognizer.

In step 330, the system initiates a response via a user interface of the client electronic device prior to receiving a remote speech recognition result from the remote automated speech recognizer. In other words, the client device begins presenting feedback or an output via the client device. The response corresponds to the spoken utterance, that is, the response can be a transcription of the spoken utterance, search results, commands, etc. At least an initial portion of the response is based on a local speech recognition result from the local automated speech recognizer. Typically this would be a first-delivered portion of a response.

In step 340, the speech recognition response manager modifies the response after the response has been initiated and/but prior to completing delivery of the response via the user interface such that modifications to the response are delivered via the user interface as a portion of the response. The modifications are based on the remote speech recognition result. In other words after a user interface begins producing an output response—but prior to completing that response—the response is modified and those modifications are included in the response. Modifying the response can include adding to the response, changing the response, or even restarting the response.

Figure 4:
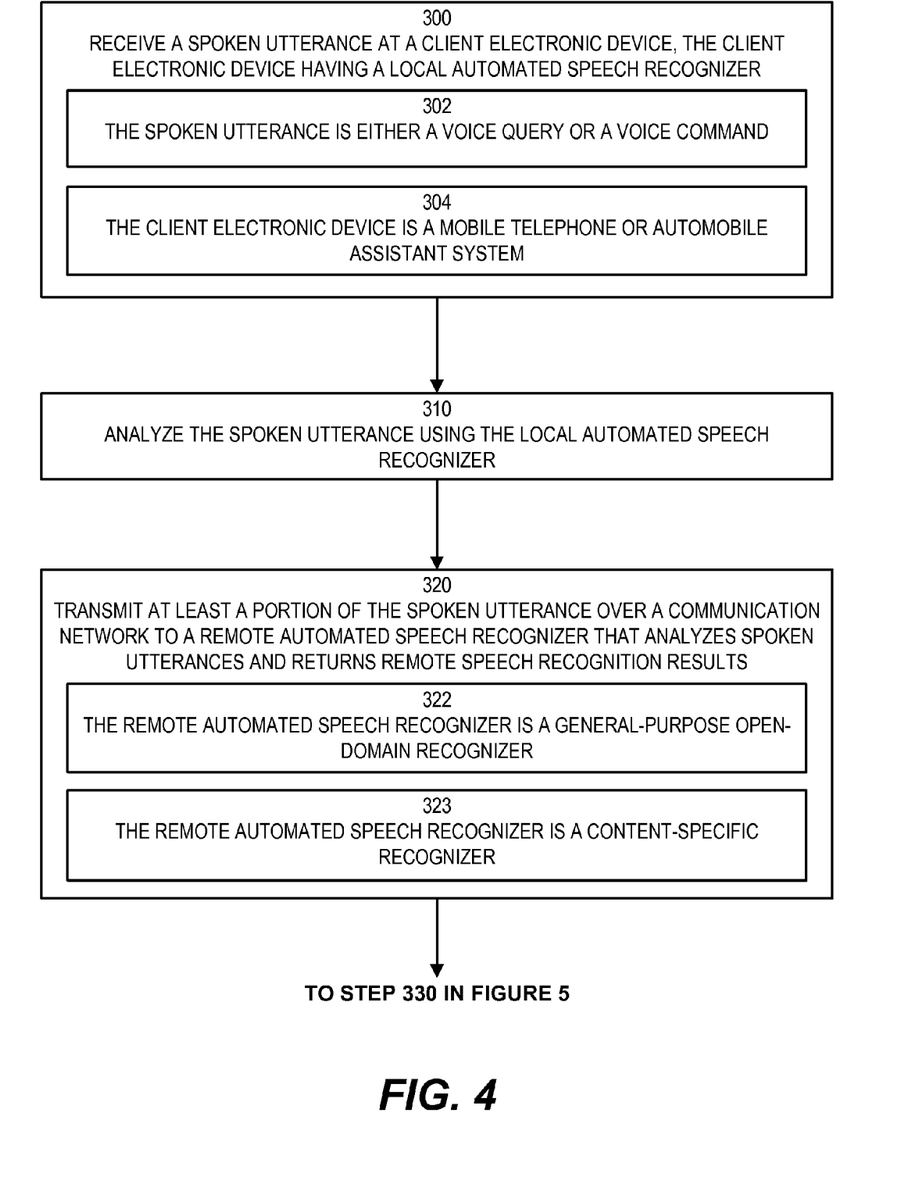
FIGS. 4-6 are a flowchart illustrating an example of a process supporting speech recognition response management according to embodiments herein.
Figure 5:
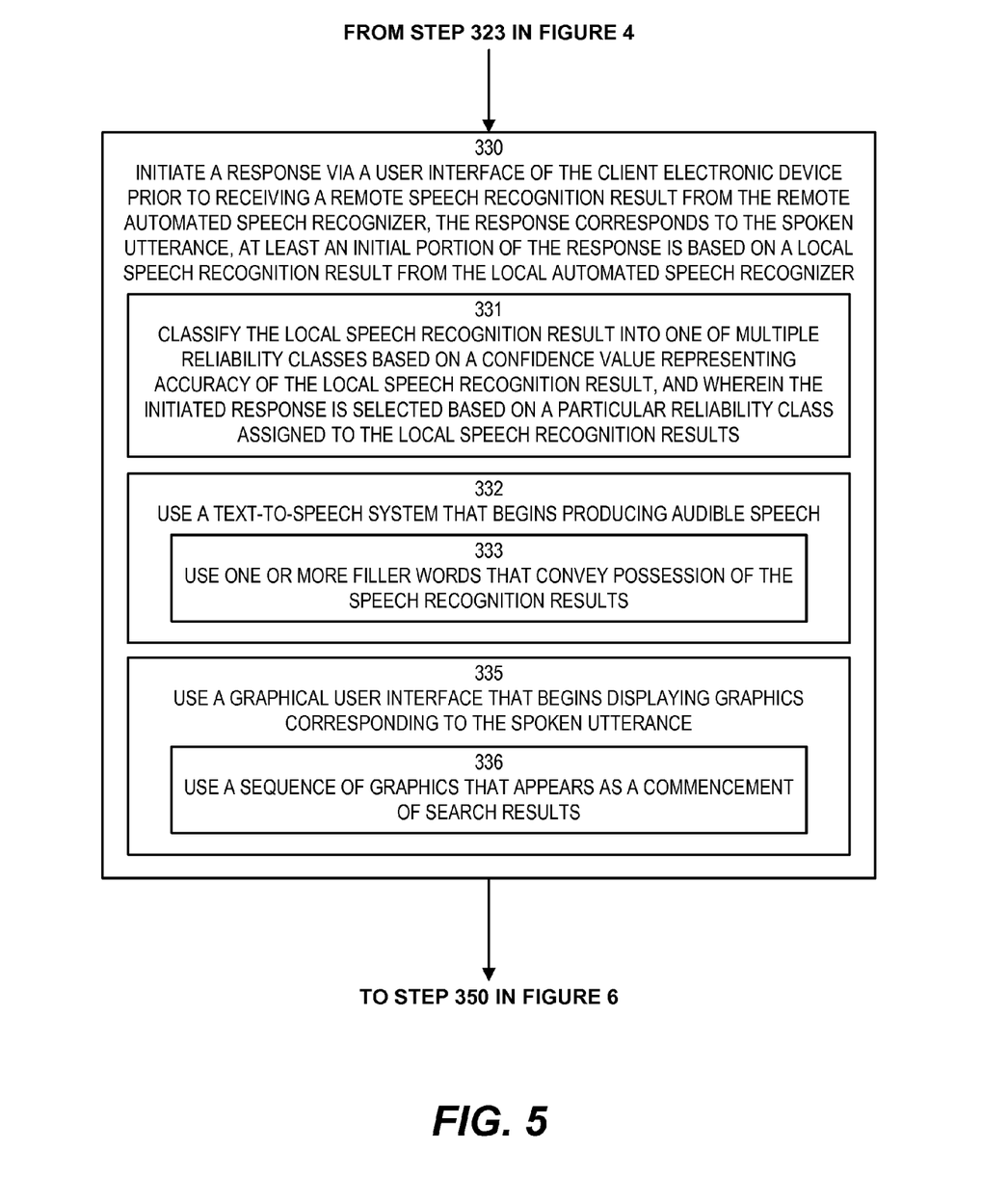
Figure 6:
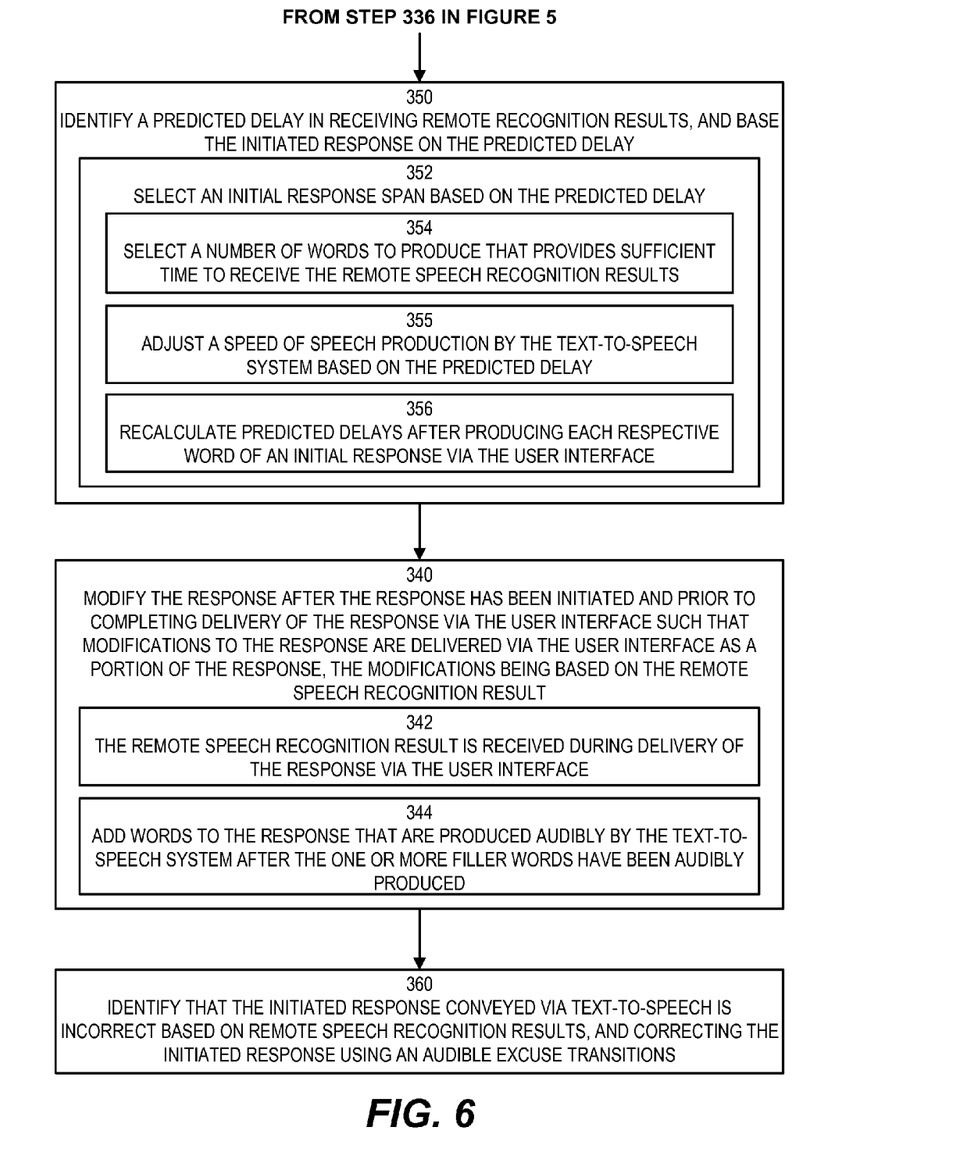

FIGS. 4-6 include a flow chart illustrating additional and/or alternative embodiments and optional functionality of the speech recognition response manager 140 as disclosed herein.

In step 300, the speech recognition response manager receives a spoken utterance at a client electronic device. The client electronic device has a local automated speech recognizer.

In step 302, the spoken utterance is received as either a voice query or a voice command. For example, a user may speak an Internet search query, location query, or issue a command for the client device to execute a task such as scheduling a restaurant reservation or appointment.

In step 304, the client electronic device is a mobile telephone, automobile assistant system, tablet computer, or other personal wireless device.

In step 310, the speech recognition response manager analyzes the spoken utterance using the local automated speech recognizer.

In step 320, the speech recognition response manager transmits at least a portion of the spoken utterance over a communication network to a remote automated speech recognizer that analyzes spoken utterances and returns remote speech recognition results.

In step 322, the remote automated speech recognizer is a general-purpose open-domain recognizer. For example, the remote recognizer is used for searching the Internet or other general purpose database. Note that typically the open-domain recognizer is located at a remote server or server cluster. In some embodiments, however, the open-domain recognizer can be located at the client device, but still take a longer processing time as compared to a local or fast recognizer. In such configurations the UI response can still be initiated prior to receiving results from the open-domain recognizer.

In step 323, the remote automated speech recognizer is a content-specific recognizer. Content-specific recognizers are powerful and fast when processing certain gated or slot contents. Such content-specific recognizers can be used with navigation, medical terminology, encyclopedic queries, calendaring, etc.

In step 330, the speech recognition response manager initiates a response via a user interface of the client electronic device prior to receiving a remote speech recognition result from the remote automated speech recognizer. The response corresponds to the spoken utterance. At least an initial portion of the response is based on a local speech recognition result from the local automated speech recognizer.

In step 331, the speech recognition response manager classifies the local speech recognition result into one of multiple reliability classes based on a confidence value representing accuracy of the local speech recognition result. Optionally, the classifier can use more than a local confidence value for decision making. For example, classification can be based on both a local confidence value and wording returned by a local recognizer, or other features. The initiated response is then selected based on a particular reliability class assigned to the local speech recognition results. For example, reliability classes can be based on a percentage accuracy prediction. By way of a specific example, an "Accepted" class might be a 90% accuracy prediction or 98% accuracy prediction depending on a particular type of input.

Note, the classifier of the local ASR result's accuracy can be used to assess reliability of the local ASR result immediately after the local ASR result becomes available. A reliability class output by the classifier can then be used to decide which kind of quick response to produce. For example, one response can be to "hold on" or wait. Another response can signal to produce a mutable response—that the speech recognition response manager can most likely modify if the remote ASR result lead to rejecting the local hypothesis. Another response can signal to produce a final response, if the speech recognition response manager is certain (or almost certain) that the local ASR result is correct. Note that such final responses can be quick and natural, but might not lend itself well to modification if needed. In other words, the classifier can make a decision at a relatively earlier point in time in to decide which kind of initial response to render.

In step 332, the speech recognition response manager uses a text-to-speech system that begins producing audible speech. In other words, the client device begins "speaking" the response to a corresponding user.

In step 333, the speech recognition response manager uses one or more filler words that convey possession of the speech recognition results. For example, the speech recognition response manager can begin speaking words such as "Searching the Internet for . . . " These words do no convey any specific search results, but nevertheless can lead to a user thinking or perceiving that the client device already has the results and is merely in the process of delivering those results—even though full results may not yet be available to the client device.

In step 335, the speech recognition response manager uses a graphical user interface that begins displaying graphics corresponding to the spoken utterance. For example, if the spoken utterance were a navigation request to a specific destination, a display of a client device can begin showing a high level view of a map, or show an animation of traveling across a map, or other graphics the convey a map application or display is beginning to load.

In step 336, the speech recognition response manager uses a sequence of graphics that appear as a commencement of search results. As described above, the graphical display can functionally approximate the serial nature of a spoken audible response and show some preliminary graphical animations that appear as if the response is just in the process of displaying a result that is already available to the client device.

In step 350, the speech recognition response manager identifies a predicted delay in receiving remote recognition results, and then bases the initiated response on the predicted delay. For example, different introductory words can be selected depending on whether the predicted delay is one second or three seconds or otherwise.

In step 352, the speech recognition response manager selects an initial response span based on the predicted delay. Such a response span can be identified by a number of words or a length of time in delivering introductory words.

In step 354, the speech recognition response manager selects a number of words to produce that provides sufficient time to receive the remote speech recognition results.

In step 355, the speech recognition response manager adjusts a speed of speech production by the text-to-speech system based on the predicted delay.

In step 356, the speech recognition response manager recalculates predicted delays after producing each respective word of an initial response via the user interface.

Thus, in one example embodiment, the speech recognition response manager can first assesses a predicted delay of the remote recognition result, and together with the predicted reliability class of the local ASR the speech recognition response manager can select an optimal initial announcement prefix like "Searching the web for . . . " A given reliability class can then help with selecting an optimal prefix wording, while the predicted delay helps select an optimal length of the wording. Note that the initial announcement prefix can be prolonged such as when the remote result comes later than the predicted time delay.

In step 340, the speech recognition response manager modifies the response after the response has been initiated and prior to completing delivery of the response via the user interface such that modifications to the response are delivered via the user interface as a portion of the response. The modifications are based on the remote speech recognition result.

In step 342, the remote speech recognition result is received during delivery of the response via the user interface. In other words, in during audible speech synthesis and/or visual graphical animations, the remote result becomes available to the client device.

In step 344, the speech recognition response manager adds words to the response that are produced audibly by the text-to-speech (TTS) system after the one or more filler words have been audibly produced. For example, after the TTS system produces "Searching the Internet for," the TTS system adds "Apple Pie Recipes."

In step 360, the speech recognition response manager identifies that the initiated response conveyed via a text-to-speech system is incorrect based on remote speech recognition results, and in response corrects the initiated response using an audible excuse transition, such as word-based ("pardon me") and/or otherwise (throat clearing sound).

Continuing with FIG. 7, the following discussion provides a basic embodiment indicating how to carry out functionality associated with the speech recognition response manager 140 as discussed above. It should be noted, however, that the actual configuration for carrying out the speech recognition response manager 140 can vary depending on a respective application. For example, computer system 149 can include one or multiple computers that carry out the processing as described herein.

In different embodiments, computer system 149 may be any of various types of devices, including, but not limited to, a cell phone, a personal computer system, desktop computer, laptop, notebook, or netbook computer, mainframe computer system, handheld computer, workstation, network computer, router, network switch, bridge, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc.

As shown, computer system 149 of the present example includes an interconnect 143 that couples a memory system 141, a processor 142, I/O interface 144, and a communications interface 145, which can communicate with additional devices 137.

I/O interface 144 provides connectivity to peripheral devices such as input devices 135 including a computer mouse, a keyboard, a selection tool to move a cursor, display screen, etc.

Communications interface 145 enables the speech recognition response manager 140 of computer system 149 to communicate over a network and, if necessary, retrieve any data required to create views, process content, communicate with a user, etc. according to embodiments herein.

As shown, memory system 141 is encoded with speech recognition response manager 140-1 that supports functionality as discussed above and as discussed further below. Speech recognition response manager 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the speech recognition response manager 140-1. Execution of the speech recognition response manager 140-1 produces processing functionality in speech recognition response manager process 140-2. In other words, the speech recognition response manager process 140-2 represents one or more portions of the speech recognition response manager 140 performing within or upon the processor 142 in the computer system 149.

It should be noted that, in addition to the speech recognition response manager process 140-2 that carries out method operations as discussed herein, other embodiments herein include the speech recognition response manager 140-1 itself (i.e., the un-executed or non-performing logic instructions and/or data). The speech recognition response manager 140-1 may be stored on a non-transitory, tangible computer-readable storage medium including computer readable storage media such as floppy disk, hard disk, optical medium, etc. According to other embodiments, the speech recognition response manager 140-1 can also be stored in a memory type system such as in firmware, read only memory (ROM), or, as in this example, as executable code within the memory system 141.

In addition to these embodiments, it should also be noted that other embodiments herein include the execution of the speech recognition response manager 140-1 in processor 142 as the speech recognition response manager process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing descriptions of embodiments of the invention are not intended to be limiting. Rather, any limitations to embodiments of the invention are presented in the following claims.

The invention claimed is:

1. A computer-implemented method for managing speech recognition response, the computer-implemented method comprising:
   receiving a spoken utterance at a client electronic device, the client electronic device having a local automated speech recognizer;
   analyzing the spoken utterance using the local automated speech recognizer;
   transmitting at least a portion of the spoken utterance over a communication network to a remote automated speech recognizer that analyzes spoken utterances and returns remote speech recognition results;
   prior to receiving a remote speech recognition result from the remote automated speech recognizer, initiating a response via a user interface of the client electronic device, the response corresponding to the spoken utterance, wherein at least an initial portion of the response is based on a local speech recognition result from the local automated speech recognizer, wherein the local speech recognition result is classified into one of multiple reliability classes based on a confidence value representing accuracy of the local speech recognition result, and wherein the initiated response is selected based on the reliability class assigned to the local speech recognition result; and
   modifying the response after the response has been initiated and prior to completing delivery of the response via the user interface such that modifications to the response are delivered via the user interface as a portion of the response, the modifications being based on the remote speech recognition result.

2. The computer-implemented method of claim 1, wherein initiating the response includes using a text-to-speech system that begins producing audible speech.

3. The computer-implemented method of claim 2, wherein producing the audible speech includes using one or more filler words that convey possession of the speech recognition results.

4. The computer-implemented method of claim 3, wherein modifying the response includes adding words to the response that are produced audibly by the text-to-speech system after the one or more filler words have been audibly produced.

5. The computer-implemented method of claim 1, wherein initiating the response includes using a graphical user interface that begins displaying graphics corresponding to the spoken utterance.

6. The computer-implemented method of claim 5, wherein displaying the graphics includes using a sequence of graphics that appears as a commencement of search results.

7. The computer-implemented method of claim 1, wherein the remote speech recognition result is received during delivery of the response via the user interface.

8. The computer-implemented method of claim 1, further comprising:
   identifying a predicted delay in receiving remote recognition results; and
   basing the initiated response on the predicted delay.

9. The computer-implemented method of claim 8, wherein basing the initiated response on the predicted delay includes selecting an initial response span based on the predicted delay.

10. The computer-implemented method of claim 9, wherein selecting the initial response span includes selecting a number of words to produce that provides sufficient time to receive the remote speech recognition results.

11. The computer-implemented method of claim 9, wherein basing the initiated response on the predicted delay includes adjusting a speed of speech production based on the predicted delay.

12. The computer-implemented method of claim 8, wherein identifying the predicted delay includes recalculating predicted delays after producing each respective word of an initial response via the user interface.

13. The computer-implemented method of claim 1, further comprising identifying that the initiated response conveyed via text-to-speech is incorrect based on remote speech recognition results, and correcting the initiated response using an audible excuse transitions.

14. The computer-implemented method of claim 1, wherein the remote automated speech recognizer is a general-purpose open-domain recognizer.

15. The computer-implemented method of claim 1, wherein the remote automated speech recognizer is a content-specific recognizer.

16. The computer-implemented method of claim 1, wherein the spoken utterance is either a voice query or a voice command.

17. The computer-implemented method of claim 1, wherein the client electronic device is a mobile telephone.

18. A system for managing speech recognition response, the system comprising:
   a processor; and
   a memory coupled to the processor, the memory storing instructions that, when executed by the processor, causes the system to perform:
      receiving a spoken utterance at a client electronic device, the client electronic device having a local automated speech recognizer;
      analyzing the spoken utterance using the local automated speech recognizer;
      transmitting at least a portion of the spoken utterance over a communication network to a remote automated speech recognizer that analyzes spoken utterances and returns remote speech recognition results;
      prior to receiving a remote speech recognition result from the remote automated speech recognizer, initiating a response via a user interface of the client electronic device, the response corresponding to the spoken utterance, wherein at least an initial portion of the response is based on a local speech recognition result from the local automated speech recognizer, wherein the local speech recognition result is classified into one of multiple reliability classes based on a confidence value representing accuracy of the local speech recognition result, and wherein the initiated response is selected based on the reliability class assigned to the local speech recognition result; and
      modifying the response after the response has been initiated and prior to completing delivery of the response via the user interface such that modifications to the response are delivered via the user interface as a portion of the response, the modifications being based on the remote speech recognition result.

19. A computer program product including a non-transitory computer-storage medium having instructions stored thereon for processing data information, such that the instructions, when carried out by a processing device, cause the processing device to perform:
   receiving a spoken utterance at a client electronic device, the client electronic device having a local automated speech recognizer;

analyzing the spoken utterance using the local automated speech recognizer;

transmitting at least a portion of the spoken utterance over a communication network to a remote automated speech recognizer that analyzes spoken utterances and returns remote speech recognition results;

prior to receiving a remote speech recognition result from the remote automated speech recognizer, initiating a response via a user interface of the client electronic device, the response corresponding to the spoken utterance, wherein at least an initial portion of the response is based on a local speech recognition result from the local automated speech recognizer, wherein the local speech recognition result is classified into one of multiple reliability classes based on a confidence value representing accuracy of the local speech recognition result, and wherein the initiated response is selected based on the reliability class assigned to the local speech recognition result; and modifying the response after the response has been initiated and prior to completing delivery of the response via the user interface such that modifications to the response are delivered via the user interface as a portion of the response, the modifications being based on the remote speech recognition result.

\* \* \* \* \*